United States Patent [19]

Lee et al.

[11] Patent Number: 5,264,896
[45] Date of Patent: Nov. 23, 1993

[54] CONTINUOUSLY VARIABLE ELECTRONICALLY ACTUATED SHUTTERING SYSTEM

[75] Inventors: James K. Lee, Rochester; Thomas M. Stephany, Churchville, both of N.Y.

[73] Assignee: Eastman Kodak Company, Rochester, N.Y.

[21] Appl. No.: 884,583

[22] Filed: May 18, 1992

[51] Int. Cl.$^5$ .................................................. G03B 9/08
[52] U.S. Cl. ................................... 354/435; 354/234.1
[58] Field of Search ............... 354/234.1, 238.1, 271.1, 354/439, 435-437, 451, 452; 310/49 R, 112, 156

[56] References Cited

U.S. PATENT DOCUMENTS

| | | | |
|---|---|---|---|
| 3,199,630 | 8/1965 | Engel et al. | 187/29 |
| 3,344,347 | 9/1967 | Stevens | 324/45 |
| 3,593,637 | 7/1971 | Fahlenberg | 354/440 |
| 4,104,656 | 8/1978 | Strauss | 354/446 |
| 4,353,632 | 10/1982 | Saito et al. | 354/133 |
| 4,558,937 | 12/1985 | Petersen et al. | 354/234.1 |
| 4,558,938 | 12/1985 | Petersen | 354/234.1 |
| 4,731,579 | 3/1988 | Petersen | 324/207 |
| 5,150,149 | 9/1992 | Alligood et al. | 354/441 |

FOREIGN PATENT DOCUMENTS 2-287446(A)  11/1990  Japan .

*Primary Examiner*—David M. Gray
*Attorney, Agent, or Firm*—Ronald Reichman

[57] ABSTRACT

An electronically actuated shutter in which the location of the shutter blades are known to accurately control the aperture opening and exposure time. A Hall sensor is used to determine the position of the shutter blades.

10 Claims, 4 Drawing Sheets

CONTINUOUSLY VARIABLE ELECTRONICALLY ACTUATED SHUTTERING SYSTEM

BACKGROUND OF THE INVENTION

Field of Invention

The invention relates generally to the field of photographic camera shutters, and particularly to electromagnetic activated camera shutters that control both the aperture size and the exposure time.

Shutters that control both the aperture and exposure time have been used to regulate the amount of light that reaches the imaging area of a filmstrip contained within a camera. Open loop systems have been utilized as taught by the prior art to control the operation of the shutter blades. In an open loop system the input to the shutter is a complex waveform that is tailored to a particular shutter, and no information about the location of the shutter blades is provided to the electronics that controls the shutter. However, the characteristics of a shutter change with time. This is due to changes in friction of the shutter's components which is caused by contamination and wear of the shutter. Thus, the same control signal will not continuously cause the camera shutter blades to form the same aperture size in the same exposure time. Thus, one of the disadvantages of the prior art is that the shutter's electronics did not know the location of the shutter blades to precisely control the size of the aperture opening and exposure time.

Another disadvantage of the prior art is that a lock in torque or reluctance torque is developed by the permanent magnet and electromagnet independent of the current in the coil of the electromagnet. This reluctance torque caused prior art electromagnet shuttering systems to be non-controllable and not capable of having many aperture openings. For instance, by incrementally varying the current in the coil of the electromagnet one would not be able to incrementally change the position of the permanent magnet so that the shutter blades will form many different aperture openings.

SUMMARY OF THE INVENTION

The present invention overcomes the disadvantages of the prior art by providing an electronically actuated shutter in which the location of the shutter blades is known and used to accurately control the aperture size and exposure time. The present invention also substantially reduces the reluctance torque developed by the permanent magnet and electromagnet so that may different aperture openings may be obtained.

The foregoing is achieved by providing a continuously variable electronically actuated shuttering device which controls both the aperture size and exposure time of one or more shutter blades, the system comprising:

a yoke comprising a core and a coil, the coil being capable of receiving current to produce a first magnetic field within a space bounded by said core;

a moveable magnet that is coupled to the shutter blades, the magnet having a second magnetic field and being positioned within the space in a manner that a gap will continuously surround the magnet and be present between the core and the magnet so that the second magnetic field interacts with the first magnetic field;

a sensor exposed to the interaction of said first and second magnetic fields for providing a signal indicative of the position of the magnet; and means coupled to the coil and responsive to the signal for regulating the first magnetic field and the position of the magnet and one or more shutter blades so that the change in position of the magnet and the shutter blades form an aperture opening which will be proportional to the direction of travel and magnitude of current travelling through the coil in one direction and the change in position of the magnet and the shutter blades which closes the aperture opening will be proportional to the direction of travel and magnitude of current travelling through the coil in a second direction;

whereby, the shutter blades may form a plurality of aperture openings with a plurality of exposure times.

DESCRIPTION OF THE PREFERRED EMBODIMENTS

Figure 1:
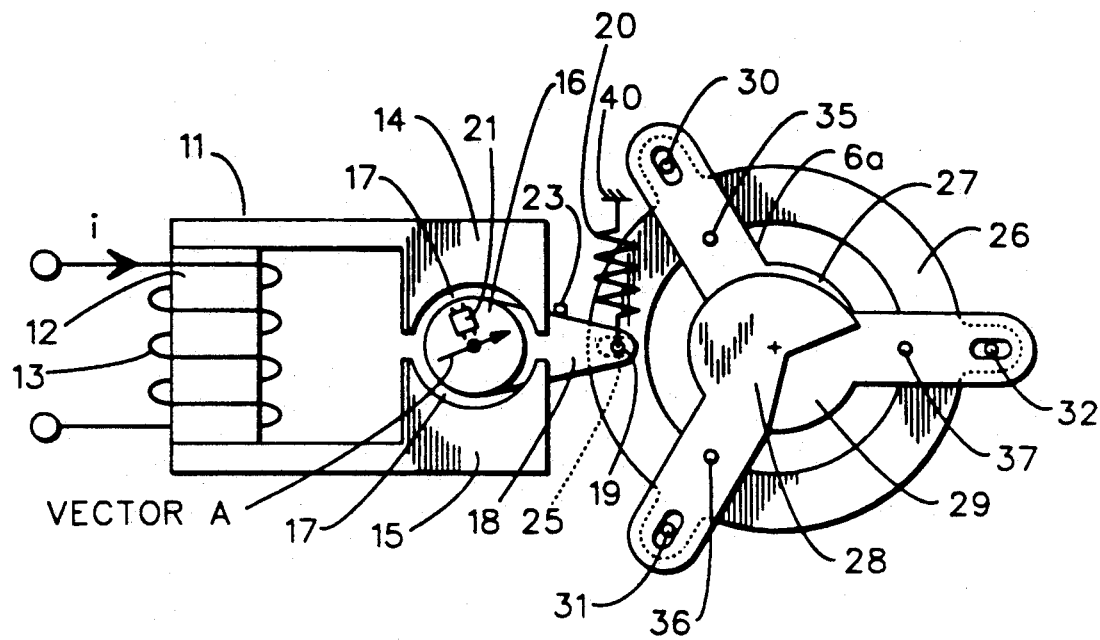
FIG. 1 is a top view of the electromagnetic shutter.

Referring now to the drawings in detail, and more particularly to FIG. 1, the reference character 11 represents a yoke that includes a core 12, a coil 13 having approximately 550 turns of #39 wire and pole tips 14 and 15. Cylindrically shaped permanent magnet 16 is positioned in yoke 11 and between pole tips 14 and 15 in a manner that a gap 17 will be formed. A arm 18 is resting against stop 23. Arm 18 is connected to magnet 16 and pin 19 of arm 18 engages slot 25 of ring 26. Ring 26 is connected to shutter blades 27, 28 and 29. Ring 26 turns on bearings (not shown). Pin 30 connects shutter blade 27 to ring 26 and pin 31 connects shutter blade 28 to ring 26. Shutter blade 29 is connected to ring 26 by pin 32. Shutter blade 27 pivots about pin 35 and shutter blade 31 pivots about pin 36. Shutter blade 29 pivots about pin 37. It is realized that additional pins may be used to connect additional shutter blades to ring 26 to increase the control of the formation of aperture openings. Spring 20 connects arm 18 to solid surface 40. Spring 20 provides the necessary torque to close shutter blade 27, 28 and 29. The spring rate of spring 20 is chosen so that the maximum opening of blades 27, 28 and 29 is achieved at about ½ the maximum input power available. This provides sufficient torque to close blades 27, 28 and 29 without power but allows blades 27, 28 and 29 to be rapidly opened and closed by the drive and control circuitry shown in FIG. 3. Magnet 16 is made from a bonded Mendelevium Iron Boron alloy which has a magnetic field of 6200 gauss with an inductance of 12000 Oersteds. Magnet 16 is magnetized across its diameter at approximately 45° from pole tips 14 and 15.

The high permeability iron that is used to form pole tips 14 and 15 is shaped around magnet 16 to form gap 17 in order to provide as little lock-in torque as is possible and also to provide the most efficient coupling of the magnetic flux generated by coil 13.

The amount of current input to coil 13 determines the magnetic flux between pole tips 14 and 15. The above magnetic flux produces a torque on magnetic 16 and consequently causes arm 18 to rotate in a counter clockwise direction. A 0.25 amp current in coil 13 will for example cause magnet 16 to move 5° relative to vector A. A 0.37 amp current in coil 13 will cause magnet 16 to move 15° relative to Vector A. A 0.50 amp current in coil 13 will cause magnet 16 to move 30° relative to vector A. A 0.75 amp current in coil 13 will cause magnet 16 to move 40° relative to vector A. This relationship between current and angle need only be approximately linear. Thus, one is able to incrementally change the position of magnet 16 so that shutter blades 27, 28 and 29 may form many different aperture openings.

A Hall effect sensor 21 is positioned in close proximity to magnet 16 to measure the magnetic fringe field produced by magnet 16. As magnet 16 rotates sensor 21 remains stationary and sensor 21 measures the changes in the magnetic flux density produced by magnet 16. The change in flux density is substantially proportional to the angular orientation of magnet 16, i.e. the position of vector A. A suitable sensor 21 is the THS108A GaAs implanted planar type Hall sensor manufactured by Toshiba.

Figure 2:
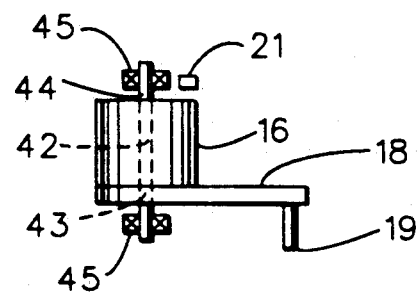
FIG. 2 is a side view of permanent magnet 16.

FIG. 2 is a side view of the components that may be used to connect magnet 16 to arm 18. Magnet 16 has a hole 42 running from its top surface to its bottom surface. Arm 18 has a hole 43 running from its top surface to its bottom surface. Shaft 44 is inserted into holes 42 and 43. Bearings 45 are connected to shaft 44 to insure that magnet 16 and arm 18 with pin 19 attached thereto may rotate about shaft 44.

Figure 3:
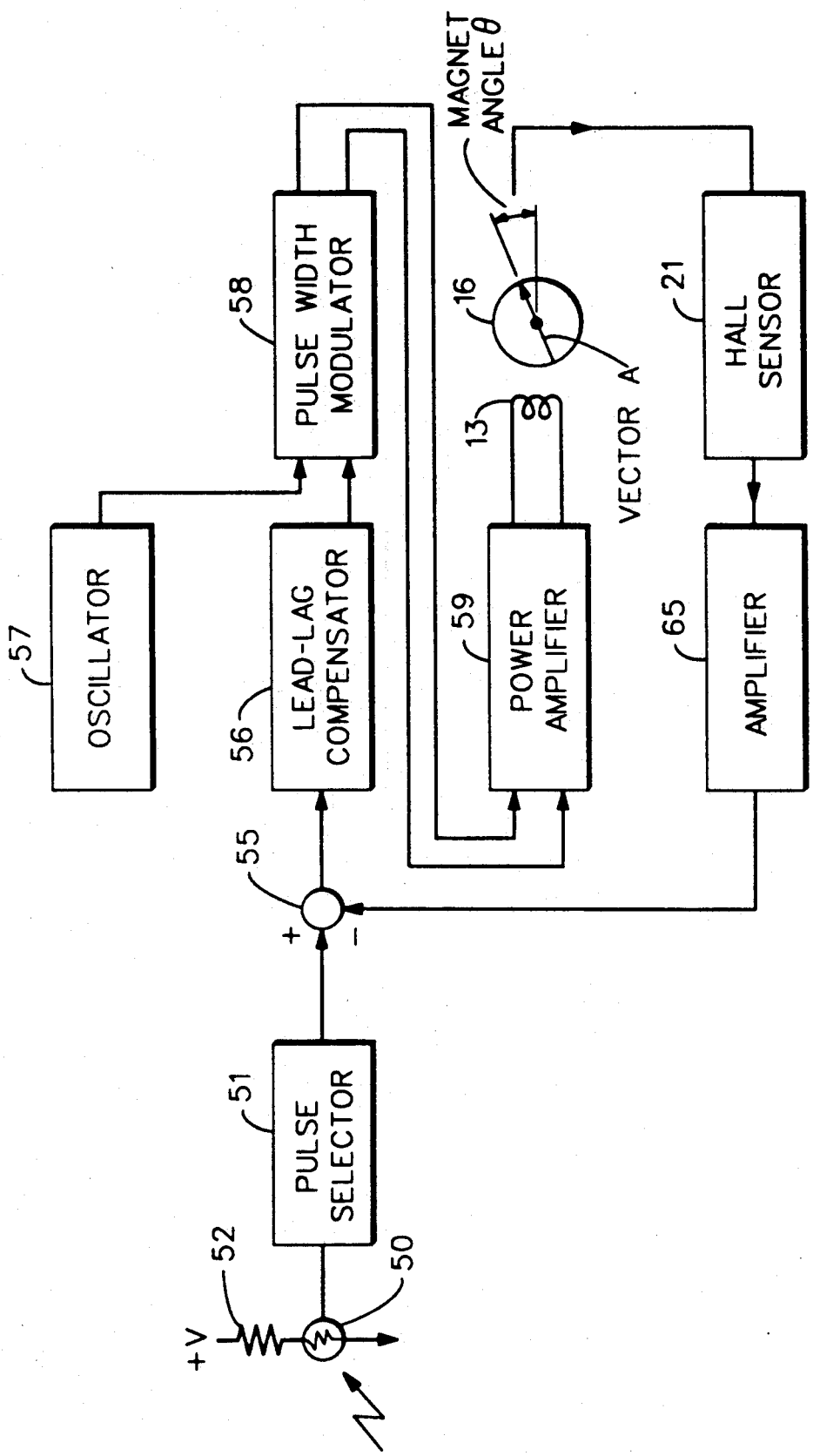
FIG. 3 is a schematic block diagram of the drive and control circuitry of the electromagnetic shutter.

FIG. 3 is a schematic block diagram of the drive and control circuit of the apparatus of the invention. Photocell 50 has two terminals. The first terminal is connected to ground and the second terminal is connected to the input of pulse selector 51 and one of the ends of resistor 52. The other end of resistor 52 is connected to a voltage source (not shown). The output of selector 51 is connected to one of the two inputs of summation amplifier 55. The second input to amplifier 55 is the output of amplifier 65. The output of amplifier 55 is connected to the input of Lead-Lag Compensator 56. The output of compensator 56 is coupled to one of the two inputs of pulse width modulator 58. The second input to modulator 58 is the output of 25 KHz oscillator 57. The two outputs of modulator 58 are connected to the inputs of a push-pull power amplifier 59. One of the outputs of amplifier 59 is coupled to one end of coil 13 and the other output of amplifier 59 is coupled to the other end of coil 13. Hall sensor 21 is in close proximity to magnet 16 and senses the magnetic field produced by magnet 16. The output of Hall sensor 21 is coupled to the input of differential amplifier 65.

Photocell 50 measures the light level of a scene that is going to be photographed and photocell 50 produces a voltage output that is proportional to the measured light level. Pulse selector 51 uses the light level measured by photocell 50 to determine the various combinations of shutter speeds and aperture openings that will supply a correct exposure to the film (not shown). The operation of selector 51 will be more fully set forth in the description of FIG. 4.

Associated with each output pulse of selector 51 is a specific shutter exposure time and a specific aperture opening. The output of selector 51 is fed to the positive input of summation amplifier 55. The negative input to summation amplifier 55 will be a signal that represents the actual position of shutter blades 27, 28 and 29 (shown in FIG. 1). The aforementioned negative signal is generated by Hall sensor 21 and amplifier 65. Analog Hall sensor 21 is a differential device that measures the changes in the magnetic flux density produced by magnet 16 (shown in FIG. 1). The magnetic fringe field from magnet 16 is much larger than the magnetic fringe field produced at the pole tips by coil 13. The amplitude of the output of sensor 21 is, therefore, directly related to the angular orientation of magnet 16. The output of sensor 21 is a feedback signal that is amplified by amplifier 65 and transmitted to the negative input of summation amplifier 55. Amplifier 55 will measure the difference between its positive and negative inputs. When the difference between the positive and negative inputs to amplifier 55 reach a desired state, amplifier 55 will output a signal that will cause magnet 16 to move to a specific orientation. This will cause shutter blades 27, 28 and 29 to form a desired aperture opening. The duration of time that amplifier 55 outputs a pulse will determine the exposure time.

Lead-Lag Compensator 56 supplies a compensation factor to the output of amplifier 55 to prevent shutters 27, 28 and 29 from overshooting the aperture opening (not shown) or having a sluggish response. Lead-Lag Compensator 56 is disclosed on page 779 of Microelectronic Circuits by Adel S. Sedra and Kenneth C. Smith (published 1991 by Sanders College Publishing), which is incorporated herein by reference.

Oscillator 57 outputs a free running 25 KHz triangular wave form that is symmetric about a stable dc voltage. Pulse width modulator 58 adds the above triangular waveform to the compensation signal outputted by compensator 56 to determine the duty cycle of the signal that will cause the movement of magnet 16 and the direction magnet 16 will travel, i.e. clockwise or counter-clockwise. The operation and description of modulator 58 will be more fully set forth in the description of FIG. 5.

The output of modulator 58 is amplified by amplifier 59 and transmitted to coil 13.

Figure 4:
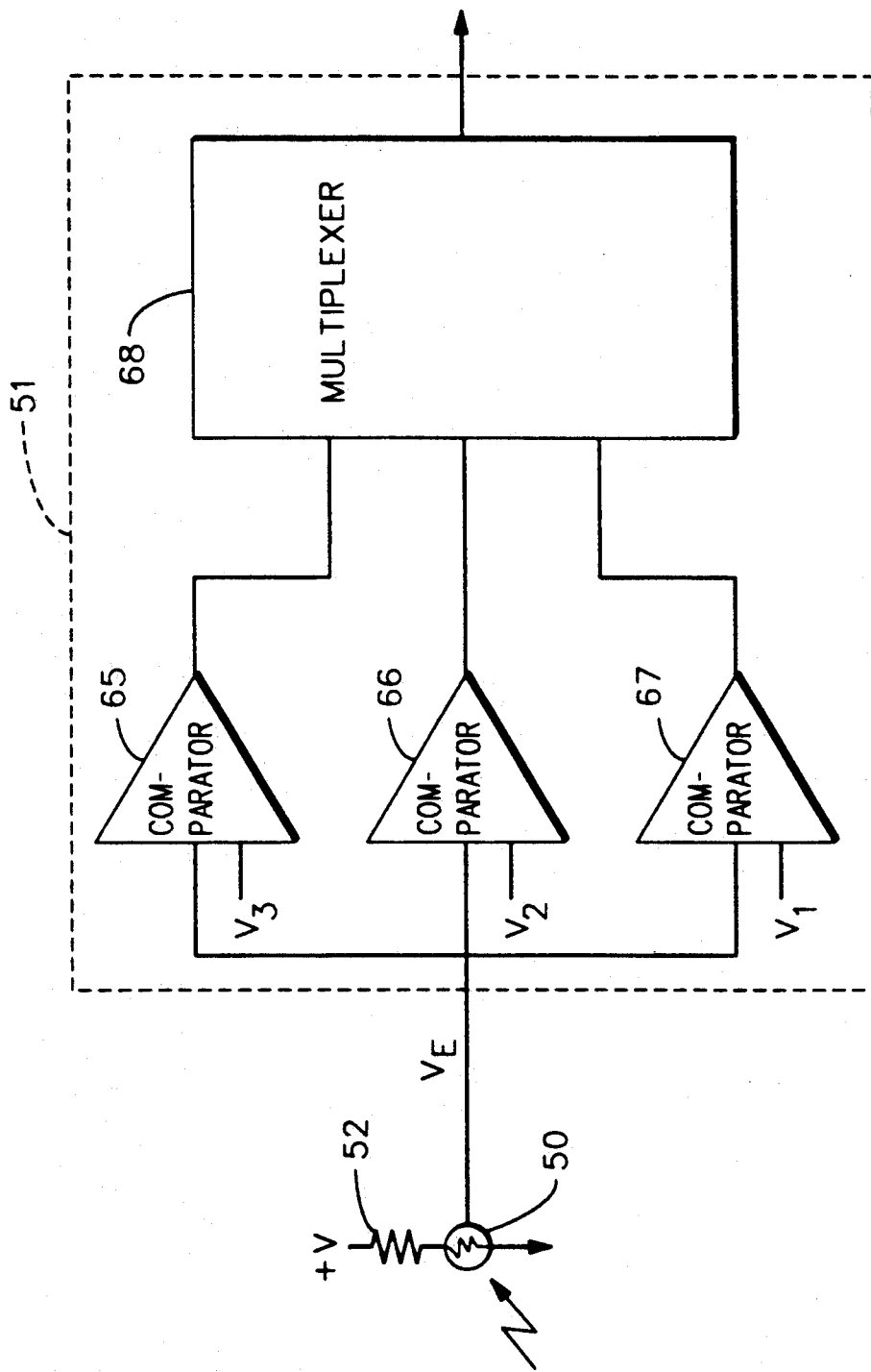
FIG. 4 is a block diagram that shows pulse selector 51 of FIG. 3 in greater detail.

FIG. 4 is a block diagram that shows pulse selector 51 of FIG. 3 in greater detail. Selector 51 is able to select one of three different aperture openings. Selector 51 includes comparators 65, 66 and 67 and multiplexer 68.

Photocell 50 measures the light level of a scene that is going to be photographed and photocell 50 produces a voltage output $V_E$ that is proportional to the measured light level. The above light level $V_E$ is inputted to one of the two inputs of comparators 65, 66 and 67. The other inputs to comparators 65, 66 and 67 respectively are $V_1$, $V_2$ and $V_3$. $V_1$ is the lowest exposure reference voltage and $V_2$ is the middle exposure reference voltage. $V_3$ is the highest reference voltage. Reference voltages $V_1$, $V_2$ and $V_3$ are connected by a resistance ladder to the power supply of a camera (not shown). Comparator 67 will compare $V_E$ with $V_1$. If $V_1$ is equal to $V_E$ comparator 67 will have an output signal. Comparator 66 compares $V_E$ with $V_2$. If $V_2$ is equal to $V_E$ comparator 66 will have an output signal. Comparator 65 will compare $V_3$ to $V_E$. If $V_3$ is equal to $V_E$ comparator 65 will have an output signal. The width of the output pulse of comparator 65, 66 and 67 will determine the exposure time.

The output of comparator 65 is connected to one of the inputs of multiplexer 68 and the output of comparator 66 is connected to one of the inputs of multiplexer 68. The output of comparator 67 is connected to one of the inputs of multiplexer 68. Multiplexer 68 will select the comparator that has an output to determine the aperture opening and exposure time. The output of multiplexer 68 is coupled to the positive input of summation amplifier 55 of FIG. 3. It is realized that additional comparators may be connected to a resistance ladder and multiplexer 68 to form different aperture openings and exposure times.

Figure 5:
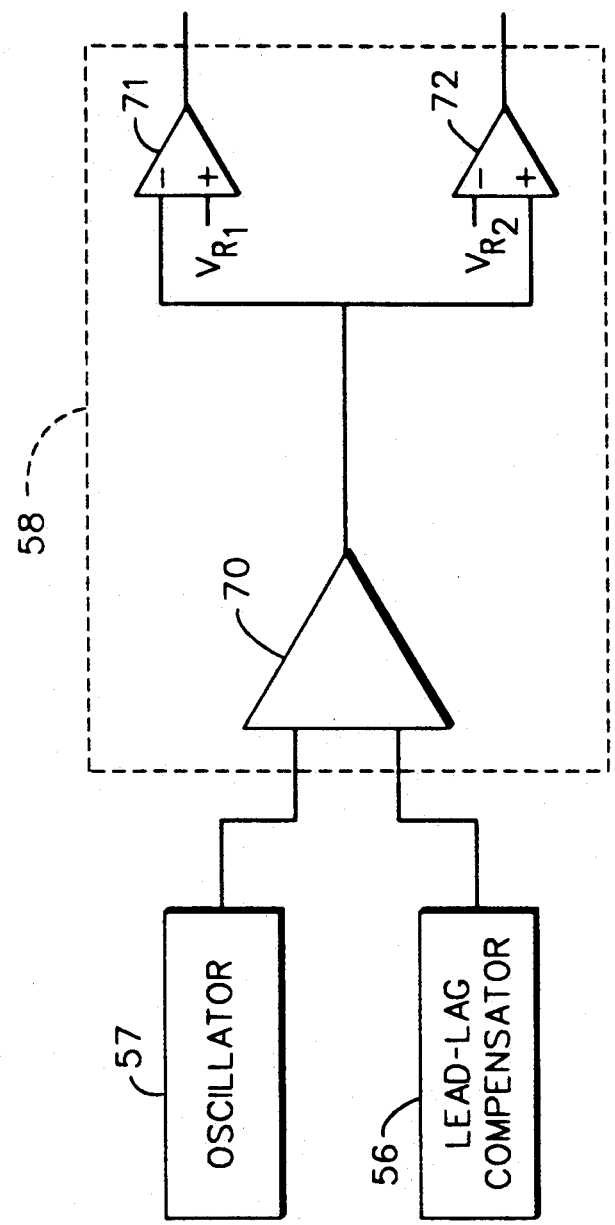
FIG. 5 is a block diagram that shows pulse width modulator 58 of FIG. 3 in greater detail.

FIG. 5 is a block diagram that shows pulse width modulator 58 of FIG. 3 in greater detail. Modulator 58 includes summation amplifier 70 and comparators 71 and 72.

One of the two inputs of amplifier 70 is connected to the free running 25 KHz triangular wave output of oscillator 57 that is stable about a dc voltage. The second input to amplifier 70 is the compensation signal outputted by compensator 56. The output of amplifier 70 is connected to the negative input of comparator 71 and the positive input of comparator 72. The positive input of comparator 71 is connected to reference voltage $V_{R1}$ which is set to 1 volt. The negative input of comparator 72 is connected to reference voltage $V_{R2}$, which is set to 2 volts. The output of comparator 71 is connected to one end of coil 13 via amplifier 59 and the output of comparator 72 is connected to the other end of coil 13 via amplifier 59.

Amplifier 70 adds the 25 KHz triangular wave output of oscillator 57 to the output of Lead-Lag Compensator 56. When the signal from compensator 56 changes and requests a positive drive current the stable dc level increases and the tips of the triangle of the triangular wave shift through a set threshold which produces positive output pulses. Comparator 71 will compare the above output pulses with $V_{R1}$, and when the two signals are equal comparator 71 will transmit a signal to one of the ends of coil 13 via amplifier 59. The aforementioned signal will cause magnet 16, arm 18, blades 27, 28 and 29 to rotate in a clockwise direction.

When the signal from compensator 56 changes and requests a negative drive current the stable dc level decreases and the tips of the triangle of the triangular wave shift through a set lower threshold which produces negative output pulses. Comparator 72 will compare the above output pulses with $V_{R2}$ and when the two signals are equal comparator 72 will transmit a signal to one of the ends of coil 13 via amplifier 59. The aforementioned signal will cause magnet 16, arm 18 and blades 27, 28 and 29 to rotate in a counterclockwise direction.

Thus, when a picture is taken amplifier 70 produces a signal which shifts the triangular waveform through the upper and lower trip points of comparators 71 and 72 producing a pulse width modulated output from comparator 71 and 72. Comparator 71 produces positive current flow and comparator 72 produces negative or reverse current flow. This effectively causes magnet 16 and arm 18 to accelerate shutter blades 27, 28 and 29 to the requested f stop and upon release brakes magnet 16, arm 18 and blades 27, 28 and 29 to their closed positions.

The above specification describes a new and improved continuously variable electromagnetic camera shutter. It is realized that the above description may indicate to those skilled in the art additional ways in which the principles of this invention may be used without departing from the spirit. It is, therefore, intended that this invention be limited only by the scope of the appended claims.

What is claimed is:

1. A continuously variable electronically actuated shuttering device which controls both the aperture size and exposure time of one or more shutter blades, said device comprising:

a yoke comprising a core and a coil, said coil being capable of receiving current to produce a first magnetic field within a space bounded by said core;

a moveable magnet that is coupled to the shutter blades, said magnet having a second magnetic field and being positioned within said space in a manner that a gap will contiguously surround said magnet and be present between said core and said magnet so that said second magnetic field interacts with said first magnetic field;

a sensor exposed to the interaction of said first and second magnetic fields for providing a signal indicative of the position of said magnet;

means for determining an aperture opening and exposure time to take a picture;

means coupled to said determining means and said sensor for measuring the difference between the aperture opening and the present position of the shutter blades so that the change in position of said magnet and the shutter blades form an aperture opening which will be proportional to the direction of travel and magnitude of current traveling through said coil in one direction and the change in position of said magnet and the shutter blades which closes the aperture opening will be proportional to the direction of travel and magnitude of current traveling through said coil in a second direction;

a clock oscillator that has an output that is symmetric about a stable voltage; and means responsive to said clock oscillator and said difference means and coupled to both ends of said coil for modulating said clock pulse and said determining means measured signal to determine the direction of travel and magnitude of the coil current traveling through said coil whereby, the shutter blades may form a plurality of aperture openings with a plurality of exposure times.

2. The device claimed in claim 1, wherein said sensor is a Hall sensor that measures the changes in the magnetic flux produced by the change in position of said magnet.

3. The device claimed in claim 1, further including: a moveable member that connects said magnet to one or more shutter blades.

4. The device claimed in claim 1, wherein said determining means comprises:

means for deciding the amount of light that is available to take a picture;

means coupled to the output of said deciding means for comparing the output of said deciding means with a plurality of individual aperture openings and selecting which aperture opening equals the opening selected by the deciding means; and a multiplexer whose input is coupled to said comparing means and whose output is coupled to said measuring means to determine the current aperture opening and exposure time.

5. The device claimed in claim 1, wherein said deciding means is a photocell that outputs voltages that are proportional to the amount of light said photocell senses.

6. The device claimed in claim 4, wherein said comparing means comprises: a plurality of comparators.

7. The device claimed in claim 1, wherein said difference means comprises: a summation amplifier.

8. The device claimed in claim 1, wherein said modulating means comprises a pulse width modulator.

9. The device claimed in claim 1, further including a Lead-Lag Compensator that is coupled to the output of said measuring means and the input of said modulating means to prevent the shutter blades from overshooting the aperture opening or having a sluggish response.

10. The device claimed in claim 1, wherein the gap of said space formed by a pair of pole tips of said core and said magnet.

* * * * *

UNITED STATES PATENT AND TRADEMARK OFFICE
CERTIFICATE OF CORRECTION

PATENT NO. : 5,264,896
DATED     : November 23, 1993
INVENTOR(S) : J. Kelly Lee and Thomas M. Stephany It is certified that error appears in the above-identified patent and that said Letters Patent is hereby corrected as shown below:

Claim 4, Column 6, Line 49         "current aperture" should read --correct aperture--

Signed and Sealed this

Nineteenth Day of July, 1994

Attest:

BRUCE LEHMAN

Attesting Officer     Commissioner of Patents and Trademarks